Fig: 1

United States Patent Office 3,442,326
Patented May 6, 1969

3,442,326
DEVICE FOR COOLING CONVERTER TRUNNIONS
Marcel Porcherot, Le Creusot, France, assignor to Société des Forges et Ateliers du Creusot, Paris, France, a corporation of France
Filed July 20, 1967, Ser. No. 654,742
Claims priority, application France, July 29, 1966, 71,359
Int. Cl. F24h *3/00*; F28f *19/00*
U.S. Cl. 165—47                         3 Claims

ABSTRACT OF THE DISCLOSURE

Device for cooling converter trunnions by the circulation of liquid, in which the cylindrical bore of each trunnion forms a cooling chamber filled with liquid supplied via a coaxial passage of annular cross-section to which the liquid is fed via a rotating joint outside the trunnion, the annular passage enclosing a tubular conduit through which the liquid is discharged to a fixed chamber which is outside the trunnion and has an evacuation spigot whose inlet is at a higher level than that of the top generatrix of the trunnion bore.

---

The invention relates to a device for cooling converter trunnions. Cooling devices are known in which the cooling liquid, which is generally water, is introduced at pressure into the trunnion via its free end and is forced to contact the inner surface of the trunnion bore, before being evacuated via a central passage connecting the free end of the trunnion to a chamber provided in the trunnion in the vicinity of its opposite end, on the converter side.

It is an object of the invention to provide a cooling device in which contact between the liquid and the inner surface of the trunnion bore is constantly ensured over the whole of the surface, whatever the feed of liquid and the angular positions of the converter may be. Another object of the invention is to provide a cooling device in which the members inside the trunnion, on the side of the converter-tilting drive, are easily accessible and can be dismantled for inspection and cleaning; this is very advantageous if the water used is "loaded" water.

According to the invention the cylindrical bore of each trunnion forms a cooling chamber filled with liquid fed from a coaxial passage of annular cross-section to which the liquid is supplied via a rotating joint outside the trunnion, the annular passage enclosing a tubular conduit through which the liquid is discharged to a fixed chamber which is outside the trunnion and has an evacuation spigot whose inlet is at a higher level than that of the top generatrix of the trunnion bore.

A description will now be given of an embodiment of the invention illustrated in the accompanying drawings, wherein.

Figure 1:
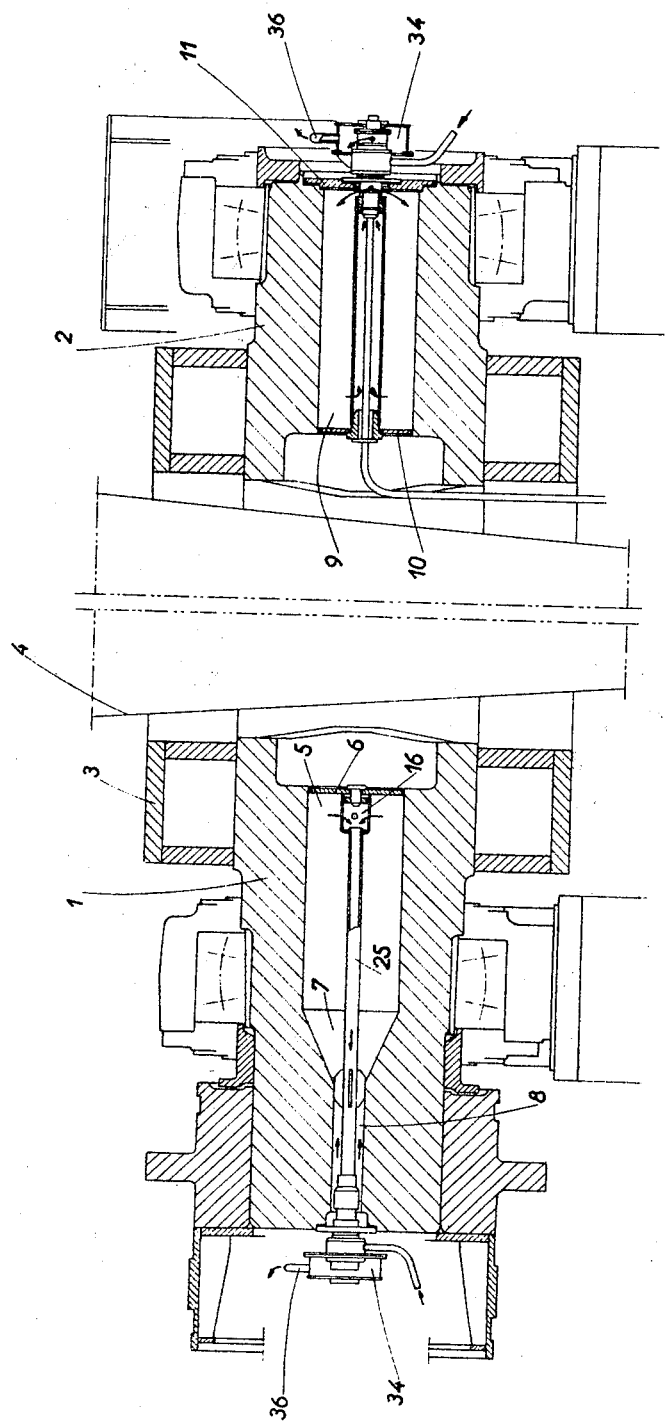
FIGURE 1 is an overall view of the two trunnions of a converter and their cooling device.

The drawings show a driven trunnion 1, and the opposite trunnion 2, the two trunnions 1, 2 being rigidly connected to supporting ring 3 of the actual converter 4. The trunnion 1 is formed with a cylindrical bore 5 closed in the direction of the converter 4 by a fixed partition 6 and connected via a conical bore 7 to a cylindrical bore 8 terminating inside the trunnion 1.

Figure 2:
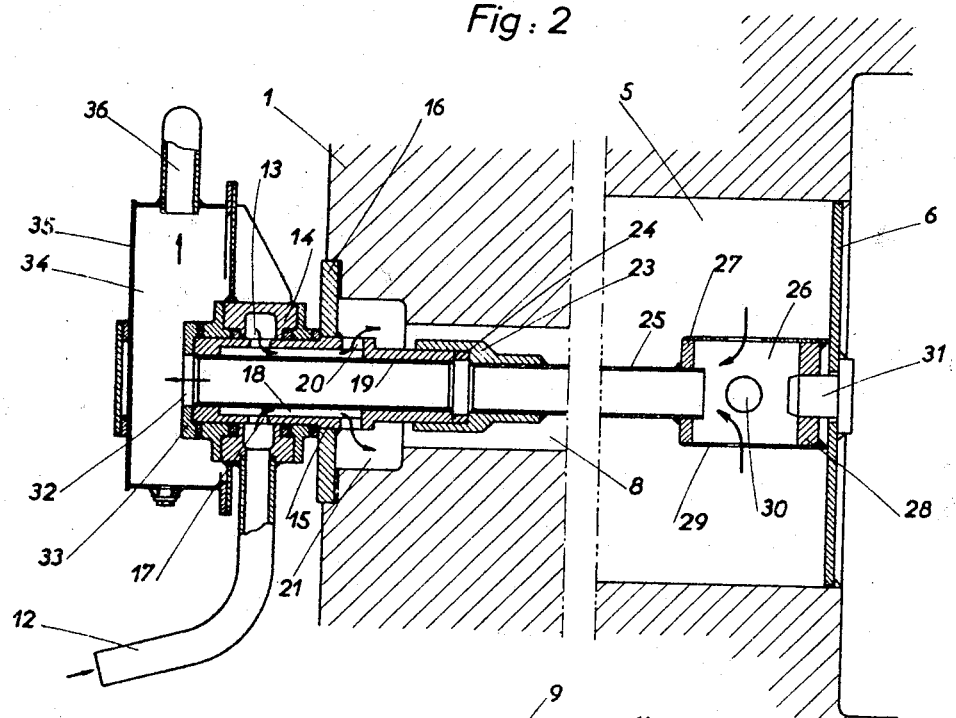
FIGURE 2 is an axial section, to an enlarged scale, through the driven trunnion.

The trunnion 2 is formed with a cylindrical bore 9 which is closed towards the converter 4 by a fixed partition 10 and from the outside by a partition 11. The bores 5, 9 form the cooling chambers of the corresponding trunnions, a cooling liquid such as water being used. The liquid circulates in the driven trunnion 1 as follows (FIGURE 2).

A water inlet passage 12 discharges into an annular chamber 13 with which a fixed casing 14 is formed which is centered in sealing-tight relationship on a sheath 15 borne by a flange 16 attached to the end of the trunnion 1. The flange 16 is formed with a radial aperture 17 supplying an annular chamber 18 enclosing a tube 19. The liquid admitted leaves the chamber 18 via radial apertures 20 and passes towards a chamber 21 which communicates via the bore 8 with the trunnion bore 5. The tube 19 is centered in the sheath 15 which is connected via a spigot 23 with the interposition of a joint 24, to a coaxial tube 25 whose other end discharges into a cavity 26 bounded by two partitions 27, 28 and a sleeve 29. Apertures 30 are provided for the return communication of the liquid, between the bore 5 and the cavity 26. A partition 28 is centered on a shaft 31 rigidly connected to the partition 6 closing the bore 5. The tube 19 discharges via an aperture 32 with which a tightening ring 33 is formed in a chamber 34 bounded by a caisson 35 unitary with the casing 14. Attached to the top portion of the caisson 35 is a bent spigot 36 whose inlet is at a level somewhat above that of the top generatrix of the bore 5. The spigot 36 is connected to an outlet passage (not shown).

The bore 5 of the trunnion 1 therefore remains constantly filled with liquid, whatever the angular positions of the converter may be. The undriven trunnion 2 can be cooled in the same way.

Figure 3:
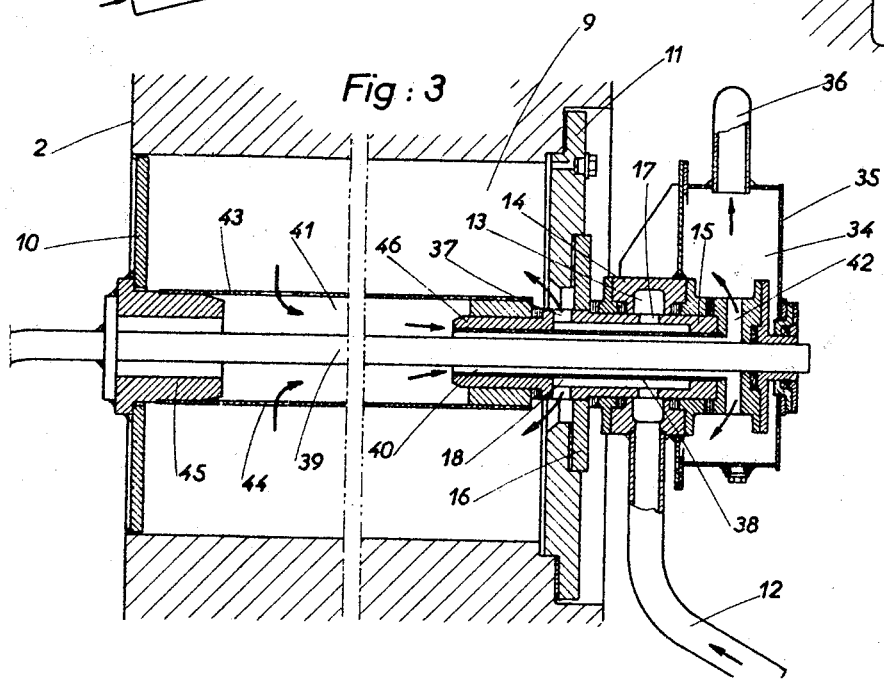
FIGURE 3 is an axial section, to an enlarged scale, through the opposite trunnion from the driven trunnion.

FIGURE 3 shows an undriven trunnion 2 through which there extends a sheath enclosing electric cables associated with a device for controlling the temperatures in the converter.

The liquid is supplied to the annular chamber 18 inside the fixed casing 14 in the same way as to the trunnion 1. Via apertures 37 the liquid flows from the annular chamber 18 into the bore 9 in the trunnion 2. The chamber 18 is formed around a tube 38 enclosing a sheath 39 for the passage of the cables, leaving around the sheath 39 an annular passage 40 connecting to one another a chamber 41, with which the center of the bore 9 is formed, and two passages 42 discharging into an evacuation chamber 34. The chamber 41 is bounded by a cylindrical sheath 43 formed with liquid inlet apertures 44, the sheath 43 being centered on a support 45 of the sheath 39 and on the end 46 of the sheath 15 enclosing the tube 38. At its emergence from the trunnion 2 the sheath 39 is supported by a flange 47 centered in the fixed caisson 35 by means of a bearing 48. To simplify matters, the foregoing does not deal with the various glands which can be provided between the various elements forming the cooling device.

Of course the device described hereinbefore could be modified in detail, or completed by an advantageous accessory member, without exceeding the scope of the invention.

I claim:

1. A device for cooling converter trunnions by the circulation of liquid, comprising a cylindrical bore in each trunnion forming a cooling chamber filled with liquid, a coaxial passage of annular cross-section in said bore feeding said chamber to which the liquid is supplied, a rotating joint outside the trunnion through which liquid is supplied to said passage, a tubular conduit in said passage through which the liquid is discharged, a fixed chamber outside the trunnion receiving the liquid from said conduit, an evacuation spigot connected into said fixed chamber and an inlet for said spigot at a higher level than the top generatrix of the trunnion bore.

2. A cooling device as set forth in claim 1, the tubular outlet conduit communicating with the cooling chamber of the trunnion through orifices at the opposite end of the cooling chamber from the liquid inlet.

3. A cooling device as set forth in claim 1, one of the trunnions having a sheath, electric cables in said sheath and a temperature-controlling apparatus inside the tubular outlet conduit for the liquid connected to said cables.

References Cited

UNITED STATES PATENTS

| | | | |
|---|---|---|---|
| 1,404,538 | 1/1922 | Mitchell | 308—76 |
| 3,167,332 | 1/1965 | Simmers | 308—77 |

ROBERT A. O'LEARY, *Primary Examiner.*

C. SUKALO, *Assistant Examiner.*

U.S. Cl. X.R.

165—134; 308—7.6